United States Patent
Ma et al.

(10) Patent No.: US 7,272,165 B2
(45) Date of Patent: Sep. 18, 2007

(54) METHOD AND SYSTEM FOR CHANNEL ESTIMATION IN WLAN

(75) Inventors: Kuang-Ping Ma, Hsinchu (TW); Aaron Wu, Hsinchu (TW); Chia-Yung Chiu, Hsinchu (TW); Chen-Yen Huang, Hsinchu (TW); Albert Chen, Hsinchu (TW)

(73) Assignee: Intergrated System Solution Corp., Hsinchu (TW)

( * ) Notice: Subject to any disclaimer, the term of this patent is extended or adjusted under 35 U.S.C. 154(b) by 730 days.

(21) Appl. No.: 10/721,355

(22) Filed: Nov. 26, 2003

(65) Prior Publication Data

US 2005/0111523 A1 May 26, 2005

(51) Int. Cl.
*H04B 1/00* (2006.01)
(52) U.S. Cl. .................................. 375/147; 375/148
(58) Field of Classification Search ................ 375/147, 375/149, 346; 370/335, 342
See application file for complete search history.

(56) References Cited

U.S. PATENT DOCUMENTS 5,764,685 A * 6/1998 Tanaka et al. .............. 375/130
7,020,180 B2 * 3/2006 Challa et al. ............... 375/147
7,054,396 B2 * 5/2006 Shan ......................... 375/346

* cited by examiner

*Primary Examiner*—Mohammed Ghayour
*Assistant Examiner*—Lawrence Williams
(74) *Attorney, Agent, or Firm*—Birch, Stewart, Kolasch & Birch, LLP

(57) ABSTRACT

A system and method for channel estimation in a wireless local area network. A corresponding channel estimation method includes the steps of: receiving a preamble message and despreading the preamble message into several symbol signals, each symbol signal containing several discrete signals; determining for each symbol signal a peak sign assignment; establishing several data windows for the symbol signals at the starting points of the discrete signals; multiplying the discrete value of each discrete signal of each data window by the corresponding peak sign assignment and accumulating the product in the first data frame; repeating the above steps for the next discrete signal and accumulating them in the second data frame, . . . , the Nth data frame; computing the accumulated value in the data frames and obtaining the data frame with the maximum value; estimating a channel signal from the previously determined data frame.

8 Claims, 4 Drawing Sheets

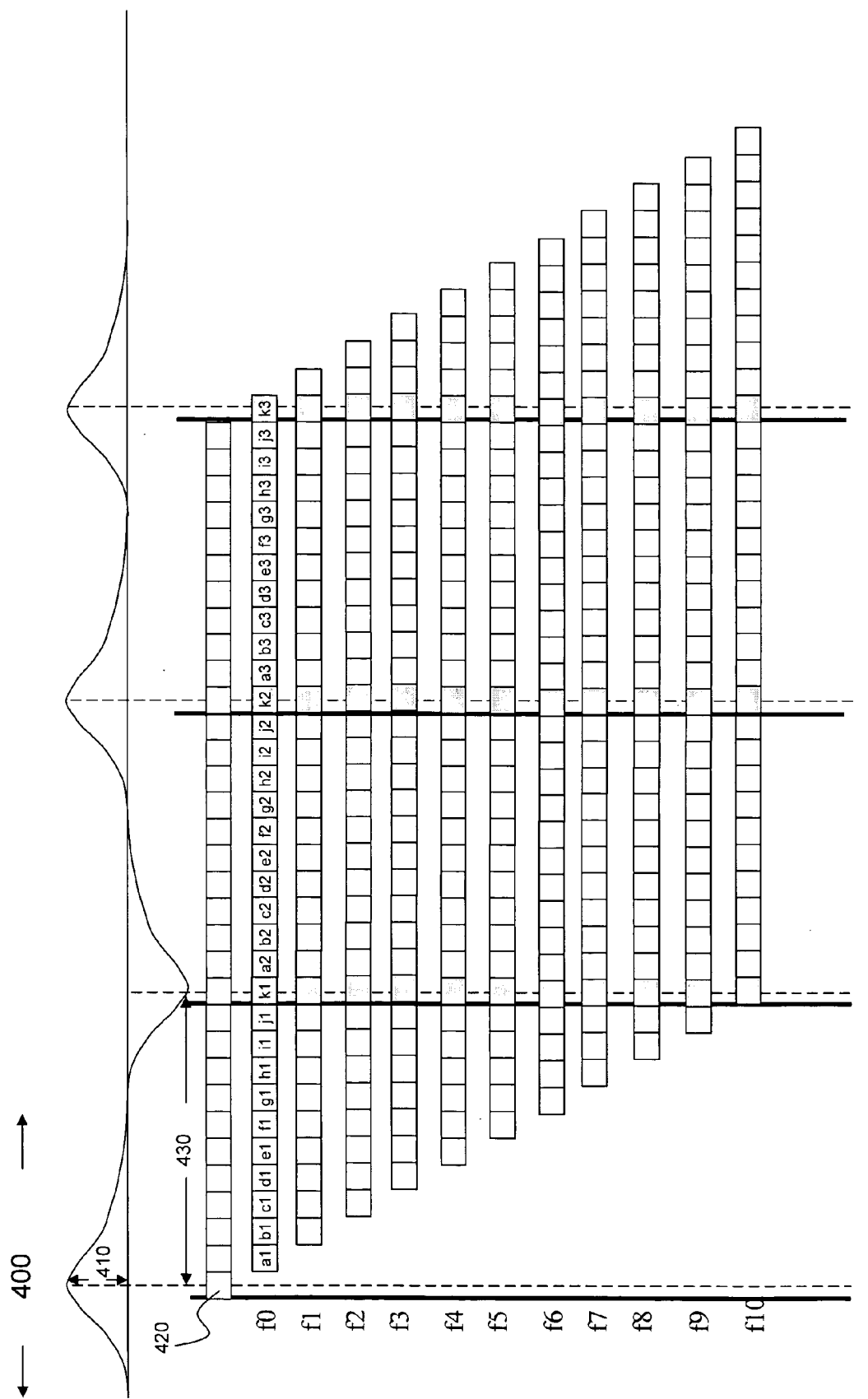

METHOD AND SYSTEM FOR CHANNEL ESTIMATION IN WLAN

BACKGROUND OF THE INVENTION

1. Field of Invention

The invention relates to a method for channel estimation and the corresponding system. In particular, the invention relates to a method and its system for channel estimation in a wireless local area network.

2. Related Art

The high speed of IEEE802.11g comes from the use of the design of an orthogonal frequency division multiplexing (OFDM) module. The OFDM module design is the same as the one used by IEEE 802.11a. The compatibility comes from the use of 2.4 GHz bandwidth, which supports the old complementary code keying (CCK) module. The CCK module is the same as the one used by IEEE 802.11b. The new protection mechanism follows the standards in the 11 g draft. However, the drawbacks in IEEE 802.11g are the same as IEEE 802.11b. For example, there are only three sets of non-overlapping channels. Both of them are likely to be interfered by cordless phones and microwave ovens. Therefore, the IEEE 802.11g equipment will face the same interference problem as IEEE 802.11b.

The above-mentioned problem occurs in wireless local area network signal transmissions. The electromagnetic waves reflect off obstacles many times. The signal received by the receiving end can be viewed as the overlap of many original transmission signals multiplied by a constant and delayed by a period of time. This effect is called the multiple path attenuation. If it is not properly taken care of, the efficiency of the receiving machine will be reduced. Generally speaking, the receiving machine has an equalization circuit to remove the multiple path attenuated signal. In the existing wireless local area network (WLAN) system, the channel model is extracted from the message contained in a packet preamble. In some WLAN systems, such as IEEE802.11b, the original message sent in the packet preamble is the same. Through a shuffler, the preamble message becomes unknown to the receiving machine. After a multiple path channel, the starting point of the multiple path channel is hard to obtain. However, the starting point of the multiple path channel has to be obtained for some receiving machine channel model computation methods.

SUMMARY OF THE INVENTION

In view of the foregoing, the invention discloses a channel estimation method and system for a wireless local area network (WLAN). It uses a simple but effective method to obtain the starting point of a multiple path channel profile. This method is used for channel model computations.

The disclosed system includes a despreader, a peak detector, a data window operating unit, and a data frame operating unit.

The disclosed method includes the steps of: receiving a preamble message of a spread signal with a sequence and despreading the preamble message into several symbol signals, each symbol signal containing several discrete signals; determining for each symbol signal a peak sign assignment; establishing several data windows for the symbol signals at the starting points of the discrete signals; multiplying the discrete value of each discrete signal of each data window by the corresponding peak sign assignment and accumulating the product in the first data frame; repeating the above steps for the next discrete signal and accumulating them in the second data frame, the third data frame, ..., the Nth data frame; computing the accumulated value in the data frames and obtaining the data frame with the maximum value; estimating a channel signal from the previously determined data frame.

The invention further provides a rapid computation method that determines the starting point of a multiple path channel profile to enhance the channel estimation efficiency.

BRIEF DESCRIPTION OF THE DRAWINGS

The invention will become more fully understood from the detailed description given hereinbelow illustration only, and thus are not limitative of the present invention, and wherein:

FIG. 4 is a schematic view of the disclosed channel estimation algorithm.

DETAILED DESCRIPTION OF THE INVENTION

Figure 1:
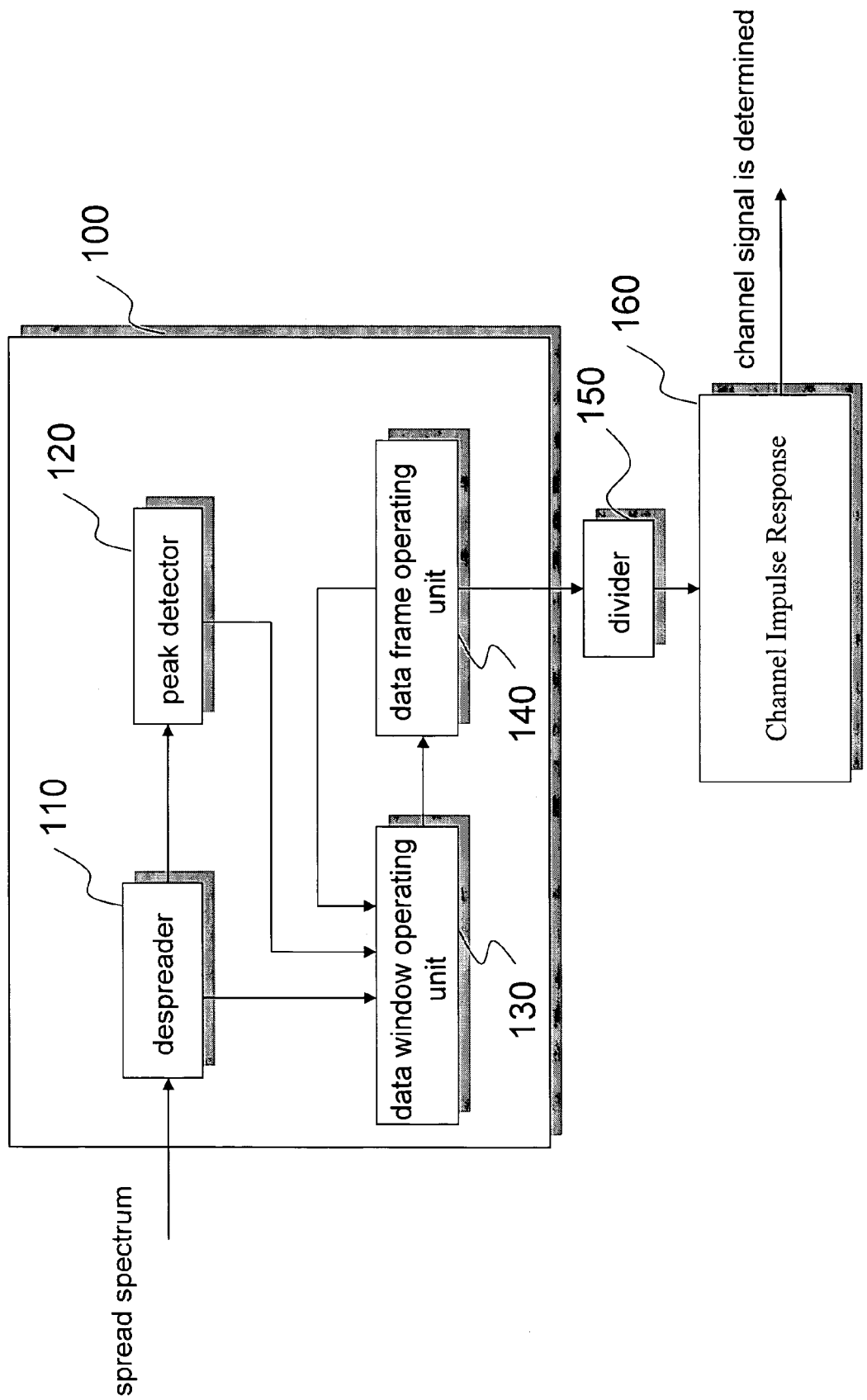
FIG. 1 is a block diagram of the disclosed system structure.

As shown in FIG. 1, the channel estimation system 100 contains: a despreader 110, a peak detector 120, a data window operating unit 130, and data frame operating unit 140.

The despreader 110 receives a preamble message of a spread spectrum (SS) signal with a sequence and despreads the preamble message into several symbol signals. Each of the symbol signals contains several discrete signals. The SS technology adds a noise to the signal to be sent and sends the combined signal out. At the receiving end, the added noise is removed to recover the original signal. The noise being added on purpose is called the pseudo-random noise code (PN code).

The peak detector 120 determines a peak sign assignment for each SS signal. Since each SS signal is presented by irregular positive and negative phases. When the SS signal is in the positive phase, its peak sign assignment value is positive. When the SS signal is in the negative phase, its peak sign assignment value is negative.

The data window operating unit 130 multiplies a discrete value of each discrete signal of each data window by the peak sign assignment of the corresponding data window. The product is accumulated to the first data frame.

The data frame operating unit 140 repeats the procedure for the next discrete signal, accumulates them to the second data frame, the third frame, ..., the Nth data frame. By computing the value in each of the data frames, the one with the maximum value is determined, thereby determining a channel signal.

The invention first despreads preamble message, despreading the preamble message into several symbol signals. It is done by decomposing the preamble message into several symbol signals, followed by processing each discrete signal of each symbol signal. The actual channel estimation has to use a divider 150, which divides the discrete signals by its fraction and length. A channel signal is thus determined so that the channel signal can be estimated according to a predetermined channel impulse response 160.

Figure 2:
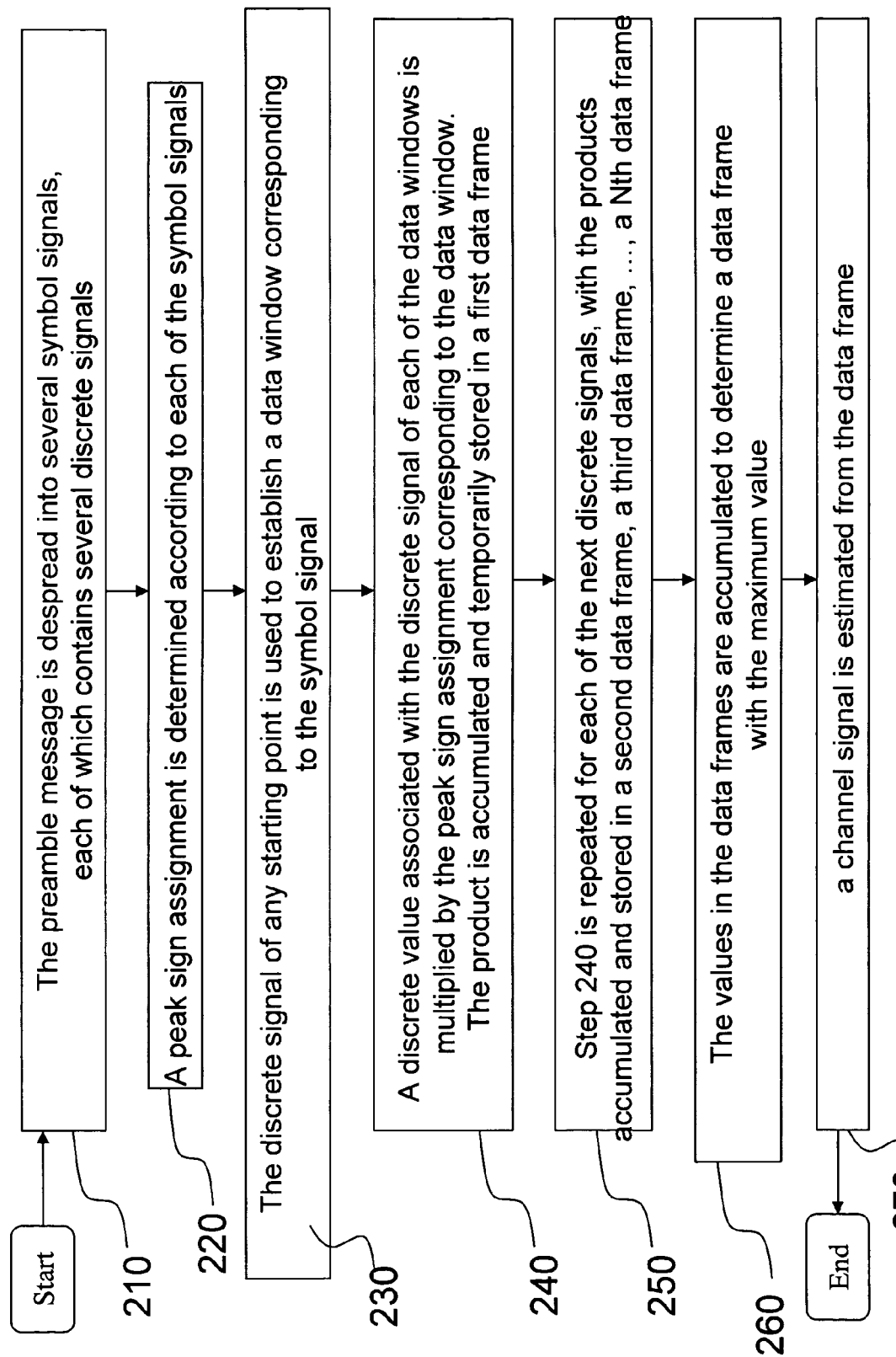
FIG. 2 is a flowchart of the disclosed method.

The flowchart of the disclosed method is shown in FIG. 2. First, the system receives a preamble message containing a spread spectrum signal with a sequence. The preamble message is despread into several symbol signals, each of which contains several discrete signals (step 210). A peak sign assignment is determined according to each of the symbol signals (step 220). The discrete signal of any starting point is used to establish a data window corresponding to the symbol signal (step 230). A discrete value associated with the discrete signal of each of the data windows is multiplied by the peak sign assignment corresponding to the data window. The product is accumulated and temporarily stored in a first data frame (step 240). Step 240 is repeated for each of the next discrete signals, with the products accumulated and stored in a second data frame, a third data frame, . . . , a Nth data frame (step 250). The values in the data frames are accumulated to determine a data frame with the maximum value (step 260). Finally, a channel signal is estimated from the data frame (step 270).

Figure 3:
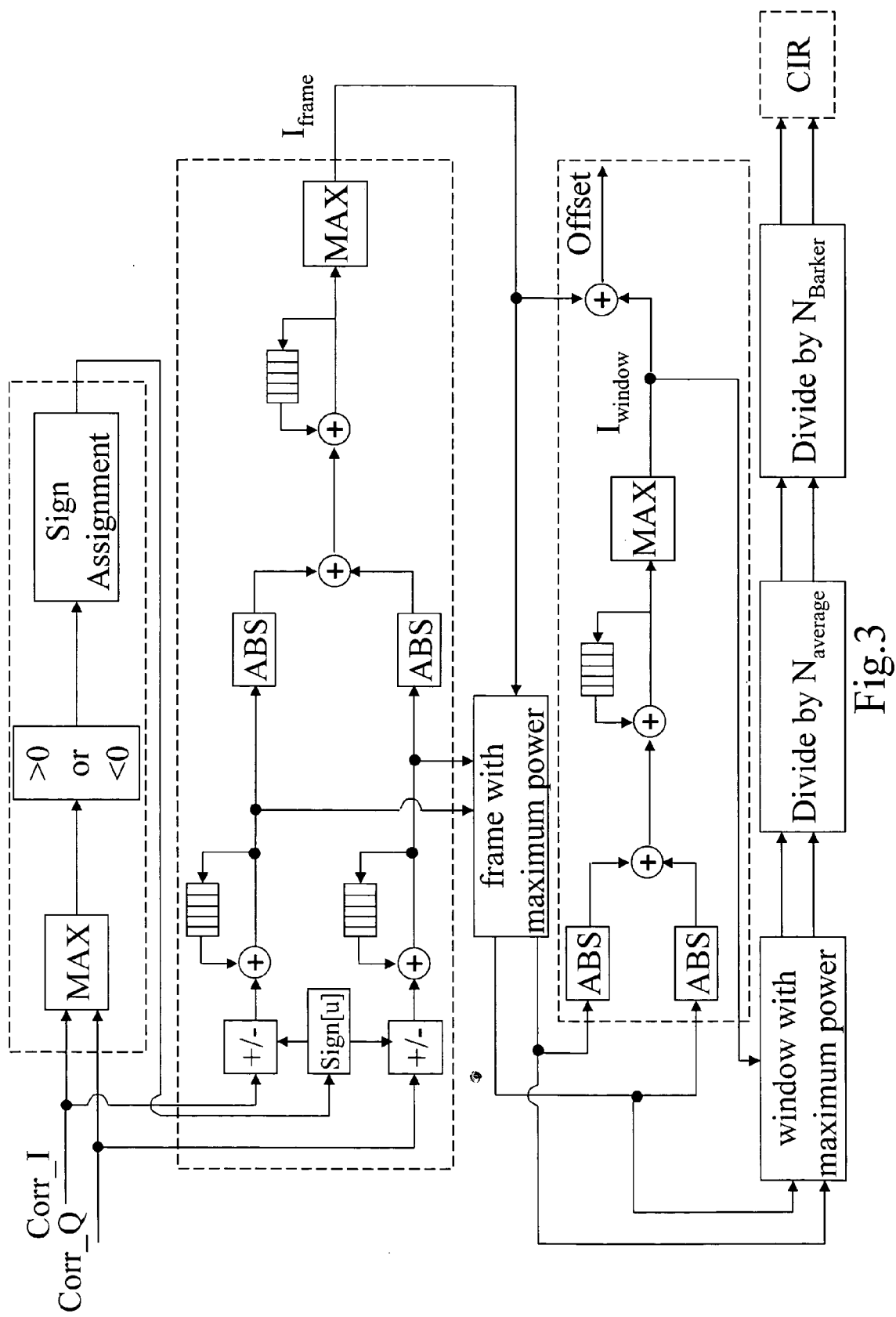
FIG. 3 is a block diagram of the detailed system structure of the invention.

FIG. 3 shows the detailed system structure of the invention. When a receiving end receives a preamble message and despreads it into several symbol signals, each symbol signal contains two orthogonal modulated components (Corr_I, Corr_Q). Since the symbol signal is represented by complex numbers (I+jQ) for the convenience of computation, we pick the maximum of either one of the modulated components as the peak sign assignment.

Each symbol signal contains several discrete signals. The discrete signal of any starting point being received is used to establish several data windows associated with the symbol signal. The discrete value of each of the discrete signals of each data frame is multiplied by the peak sign assignment corresponding to the data window. The product is accumulated in a first data frame. It should be mentioned that each symbol signal is represented in positive and negative phases in an irregular way. If the symbol signal is in the positive phase, the peak sign assignment is positive. If the symbol signal is in the negative phase, the peak sign assignment is negative. Afterwards, the first received phase is sorted. The first phase can start from the first starting point being received. For the rest of the discrete signals, sorting is performed for the second, third, . . . , and Nth phases. Likewise, the products are accumulated and temporarily stored to the second, third, . . . , Nth data frames. The accumulated value in each of the data frame is computed to determine a data frame with the maximum accumulation. A channel signal is estimated from the data frame with the maximum accumulation. The channel signal has to go through a division process according to the preamble message before the channel signal estimation is done according to the channel impulse response.

The disclosed channel estimation algorithm is schematically shown in FIG. 4. After despreading, the preamble message is decomposed into several symbol signals 400. Each of the symbol signals 400 is represented by positive and negative phases in an irregular way. Each symbol signal 400 determines a corresponding peak sign assignment 410. Each symbol signal 400 contains several discrete signals 420. In the actual channel estimation process, the discrete signals 420 can be received from any starting point. Several data windows 430 corresponding to the symbol signals 400 are then established.

We use a first embodiment to illustrate the feasibility of the disclosed method. First, a discrete value associated with each discrete signal 420 of any data window 430 (assuming the discrete signals 420 of the first received data window 430 are represented by a1, a2, a3, a4, a5, a6, a7, a8, a9, a10, and a11) is multiplied by the peak sign assignment 410 associated with the data window 430. Phase 0 is first processed. The preamble message is despread to obtain 11 data windows 430. Each of the data windows 430 is divided into 11 discrete signals 420. Therefore, one has to perform 11×11 operations. One first computes a1×(peak sign assignment 410)+a2×(peak sign assignment 410)+ . . . +a11×(peak sign assignment 410), the result being accumulated and temporarily stored in a first data frame (not shown). Afterwards, b1×(peak sign assignment 410)+b2×(peak sign assignment 410)+ . . . +b11×(peak sign assignment 410) is computed, and is accumulated and stored in the first data frame. Such a process is continued until k1×(peak sign assignment 410)+k2×(peak sign assignment 410)+ . . . +k11×(peak sign assignment 410) is computed, and is accumulated and stored in the first data frame. It should be emphasized that each symbol signal 400 is represented by positive and negative phases in an irregular way. When the symbol signal 400 is in the positive phase, the peak sign assignment 410 is positive. When the symbol signal 400 is in the negative phase, the peak sign assignment 410 is negative.

Afterwards, Phase 1 is performed to repeat the above steps for the next discrete signal. Again, there are 11×11 operations. Likewise, the products are accumulated and temporarily stored in the second, third, . . . , Nth data frames. In other words, the process is repeated for 11 times until Phase 10.

Finally, the accumulated value in each of the data frames is computed to determine a data frame with the maximum accumulation. A channel signal is then determined from the data frame with the maximum accumulation.

Despite the fact that the embodiment used in the specification takes IEEE802.11b in WLAN systems as an example, the data packet protocols for which the invention can apply are not limited by that.

From the above-mentioned embodiment, one sees that it is a simple but effective method to obtain the starting point of a multiple path channel profile. This method is combined for channel model calculations. In the actual calculations, some operations will be repeated. Therefore, the invention further provides a second embodiment for a rapid calculation of the starting point of a multiple path channel profile. The key step is step 250. As the first embodiment repeats step 240 for each of the following discrete signals, operations are thus repeated (such as a1×(peak sign assignment 410), a2×(peak sign assignment 410), etc). Such results can be obtained from the first operation. Therefore, these repeated calculations are removed. This can greatly increase the efficiency of the invention.

Certain variations would be apparent to those skilled in the art, which variations are considered within the spirit and scope of the claimed invention.

What is claimed is:

1. A channel estimation method for wireless local area network (WLAN) systems, which comprises the steps of:

(a) receiving a preamble message of a spread spectrum signal with a sequence and despreading the preamble message into a plurality of symbol signals, each of the symbol signals containing a plurality of discrete signals;

(b) determining a peak sign assignment for each of the symbol signals;

(c) establishing a plurality of data windows for each symbol signal using the discrete signal of any starting point;

(d) multiplying a discrete value associated with each of the discrete signals of each data window by the peak sign assignment associated with the data window, and accumulating and temporarily storing the product to a first data frame;

(e) repeating step (d) for each of the following discrete signals, accumulating and temporarily storing the products to a second through Nth data frame;

(f) computing the accumulated products in the data frames and determining a data frame with the maximum accumulation; and (g) computing a channel signal according to the data frame with the maximum accumulation.

2. The method of claim 1, wherein each symbol signal contains two orthogonal modulated components (Corr_I, Corr_Q).

3. A channel estimation method for wireless local area network (WLAN) systems, which comprises the steps of:

(a) receiving a preamble message of a spread spectrum signal with a sequence and despreading the preamble message into a plurality of symbol signals, each of the symbol signals containing a plurality of discrete signals;

(b) determining a peak sign assignment for each of the symbol signals;

(c) establishing a plurality of data windows for each symbol signal using the discrete signal of any starting point;

(d) multiplying a discrete value associated with each of the discrete signals of each data window by the peak sign assignment associated with the data window, and accumulating and temporarily storing the product to a first data frame;

(e) repeating step (d) for each of the following discrete signals, removing repeated operations in each accumulation, accumulating and temporarily storing the products to a second through Nth data frame;

(f) computing the accumulated products in the data frames and determining a data frame with the maximum accumulation; and (g) computing a channel signal according to the data frame with the maximum accumulation.

4. The method of claim 3, wherein each symbol signal contains two orthogonal modulated components (Corr_I, Corr_Q).

5. A channel estimation system for wireless local area network (WLAN) systems, which comprises:

a despreader, which receives a preamble message of a spread spectrum signal with a sequence and despreads the preamble message into a plurality of symbol signals, each of the symbol signals containing a plurality of discrete signals;

a peak detector, which determines a peak sign assignment for each of the symbol signals;

a data window operating unit, which multiplies a discrete value associated with each of the discrete signals of each data window by the peak sign assignment associated with the data window and accumulates and temporarily stores the product to a first data frame; and a data frame operating unit, which sends each of the following discrete signals to the data window operating unit, accumulates and temporarily stores the products to a second through Nth data frame;

wherein the accumulated products in the data frames are computed to determine a data frame with the maximum accumulation according to which a channel signal is computed.

6. The system of claim 5, wherein each symbol signal contains two orthogonal modulated components (Corr_I, Corr_Q).

7. The system of claim 5 further comprising a divider to process divisions according to the preamble message.

8. The system of claim 7, wherein the signals after division processing are used to estimate a channel signal according to a predetermined channel impulse response.

* * * * *